UNITED STATES PATENT OFFICE.

ARTHUR LÜTTRINGHAUS, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

VAT DYE.

1,010,930.     Specification of Letters Patent.     Patented Dec. 5, 1911.

No Drawing.     Application filed February 18, 1911. Serial No. 609,343.

*To all whom it may concern:*

Be it known that I, ARTHUR LÜTTRINGHAUS, Ph. D., chemist, a subject of the King of Prussia, residing at Ludwigshafen-on-the-Rhine, Germany, have invented new and useful Improvements in Vat Dye, of which the following is a specification.

I have discovered a new vat coloring matter of the anthracene series which can be obtained by condensing 1-halogen-anthraquinone-2-carboxylic acid with 3.4-dichloranilin and then subjecting the product so obtained to a further condensing action, so that the elements of water are removed and ring formation takes place. The condensation can be effected, for instance, by means of concentrated sulfuric acid or thionyl chlorid or phosphorus pentachlorid and aluminium chlorid.

My new coloring matter can be obtained, for example, as follows, but my invention is of course not confined to this example. The parts are by weight. Heat together, for from eight to ten hours, at from one hundred and fifty to one hundred and sixty degrees centigrade, five and four-fifths parts of 1-chlor-anthraquinone-2-carboxylic acid, three and one-half parts of 3.4-dichlor-anilin, one-fifth part of copper powder, six parts of anhydrous sodium acetate, and thirty to forty parts of nitrobenzene. Then distil off the nitrobenzene by means of steam and extract the residue well with hot sodium carbonate solution and treat the residue with dilute hydrochloric acid, whereupon 3'.4'-dichlor-1-anilido-anthraquinone-2-carboxylic acid is obtained. Heat forty parts of this acid in a finely powdered form with four hundred parts of anhydrous benzene and twenty-five parts of phosphorus pentachlorid, for one hour, at about sixty degrees centigrade. Then add carefully forty-five parts of aluminium chlorid and heat for a further fifteen to twenty minutes at about fifty degrees centigrade. Pour the mixture on to ice, distil off the benzene by means of steam, filter, and extract the coloring matter first with boiling dilute hydrochloric acid and then with caustic soda solution.

My new coloring matter contains chlorin and consists, when dry, of a red powder. It is soluble in hot anilin with a crimson color and is insoluble in seventy per cent. sulfuric acid, and dyes cotton from the vat beautiful red shades.

The formation of my coloring matter can be represented by the following successive formulae:

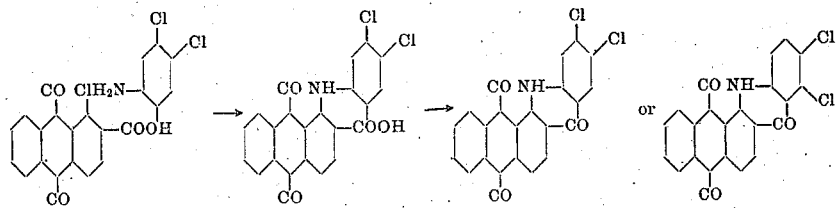

The final product is an anthraquinone-acridone containing two chlorin atoms in the benzene ring, one such chlorin atom being in the para position and the other in a meta position to the NH group.

Now what I claim is:—

The new coloring matter of the anthracene series which can be obtained from halogen-anthraquinone-2-carboxylic acid and 3.4-dichlor-anilin, which coloring matter is a dichlor-anthraquinone-acridone containing both chlorin atoms in the benzene ring, one such chlorin atom being in the para position and the other in a meta position to the NH group, which coloring matter is soluble in hot anilin with a crimson color and is insoluble in seventy per cent. sulfuric acid, and dyes cotton from the vat beautiful red shades, and which contains chlorin and consists, when dry, of a red powder.

In testimony whereof I have hereunto set my hand in the presence of two subscribing witnesses.

ARTHUR LÜTTRINGHAUS.

Witnesses:
   J. ALEC. LLOYD,
   A. O. TITTMANN.